US008024705B2

(12) United States Patent
Hughes et al.

(10) Patent No.: US 8,024,705 B2
(45) Date of Patent: Sep. 20, 2011

(54) SYSTEM, METHOD, AND COMPUTER PROGRAM PRODUCT FOR DISTRIBUTED TESTING OF PROGRAM CODE

(75) Inventors: Graham Hughes, Cambridge (GB); Darren Udaiyan, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 2708 days.

(21) Appl. No.: 10/706,848

(22) Filed: Nov. 12, 2003

(65) Prior Publication Data

US 2005/0114737 A1 May 26, 2005

(51) Int. Cl.
*G06F 9/44* (2006.01)
(52) U.S. Cl. ............. 717/124; 717/128; 717/131
(58) Field of Classification Search .............. None
See application file for complete search history.

(56) References Cited

U.S. PATENT DOCUMENTS

| | | | |
|---|---|---|---|
| 6,112,225 A | | 8/2000 | Kraft et al. |
| 6,112,243 A | | 8/2000 | Downs et al. |
| 6,142,683 A | * | 11/2000 | Madduri ............... 717/128 |
| 6,324,683 B1 | * | 11/2001 | Fuh et al. ............... 717/124 |
| 6,360,268 B1 | | 3/2002 | Silva et al. |
| 6,681,383 B1 | | 1/2004 | Pastor et al. |
| 7,673,287 B2 | * | 3/2010 | Mayer-Ullmann et al. ... 717/124 |
| 7,950,003 B1 | * | 5/2011 | Duca et al. ................. 717/124 |
| 2009/0320002 A1 | * | 12/2009 | Peri-Glass et al. ......... 717/131 |

FOREIGN PATENT DOCUMENTS

EP   1 276 047 A2   1/2003

OTHER PUBLICATIONS

Allan Bricker et al., "Condor Technical Summary," University of Wisconsin—Madison Computer Sciences Department, Version 4.1b, 1992, pp. 1-10.*
"Minimizing concurrent test time in SoC's by balancing resource usage", Zhao et al., Apr. 2002, pp. 77-82, <http://delivery.acm.org/10.1145/510000/505323/p77-zhao.pdf>.*
"Projected state machine coverage for software testing", Friedman et al., Jul. 2002, pp. 134-143, <http://delivery.acm.org/10.1145/570000/566192/p134-friedman.pdf>.*
"Efficient load balancing for wide-area divide-and-conquer applications", Van Nieuwpoort et al., Jul. 2001, pp. 34-43, <http://delivery.acm.org/10.1145/380000/379563/p34-van_nieuwpoort.pdf>.*
Summons to attend oral proceedings pursuant to Rule 115(1) EPC dated Aug. 3, 2010 in connection with European Patent Application No. 04 801 070.6.
Communication pursuant to Article 96(2) EPC dated Oct. 5, 2006 in connection with European Patent Application No. 04 801 070.6.
Communication pursuant to Article 96(2) EPC dated Apr. 18, 2008 in connection with European Patent Application No. 04 801 070.6.

* cited by examiner

*Primary Examiner* — Thuy Dao

(57) ABSTRACT

A system, method, and computer program product for distributed software code testing. When a data processing system is not being actively used, it will download and execute test code, and return the results to a server. This process increases the efficiency of code testing while exploiting otherwise-wasted processing power.

9 Claims, 4 Drawing Sheets

SYSTEM, METHOD, AND COMPUTER PROGRAM PRODUCT FOR DISTRIBUTED TESTING OF PROGRAM CODE

TECHNICAL FIELD OF THE INVENTION

The present invention is generally related to software development and testing.

BACKGROUND OF THE INVENTION

Product testing requires a large number of tests to be run, and each test result must be stored. For example, one software product in development can require a set of 16,500 tests to be regularly run to ensure proper operation. These tests can take 15 hours to run using one test machine. If a developer makes a code change there is the distinct possibility that one or more of the 16,500 tests will regress. Experience has shown that if the developers do not run the tests over their changed code on one day, they are highly likely to have a significant number of regressions to deal with the next day, and product development and release schedules will suffer.

Of course, each test is time consuming, and detracts from the progress of the product development as a whole. Further, when a data processing system is performing these tests, it is largely unusable for any other task, making it impractical to use many systems for this testing.

On the other hand, when a data processing system is not being actively used by a user, e.g., if the user was out for lunch, in a meeting or on vacation, the CPU time that could have been put to work to reduce the time required to run the test set was wasted by the machine being idle.

There is, therefore, a need in the art for a system, process and computer program product for performing efficient code testing while utilizing available data processing system processing power.

SUMMARY OF THE INVENTION

A preferred embodiment provides a system, method, and computer program product for distributed software code testing. When a data processing system is not being actively used, it will download and execute test code, and return the results to a server. This process increases the efficiency of code testing while exploiting otherwise-wasted processing power.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

A preferred embodiment provides a system, method, and computer program product for distributed software code testing. When a data processing system is not being actively used, it will download and execute test code, and return the results to a server. This process increases the efficiency of code testing while exploiting otherwise-wasted processing power.

Figure 1:
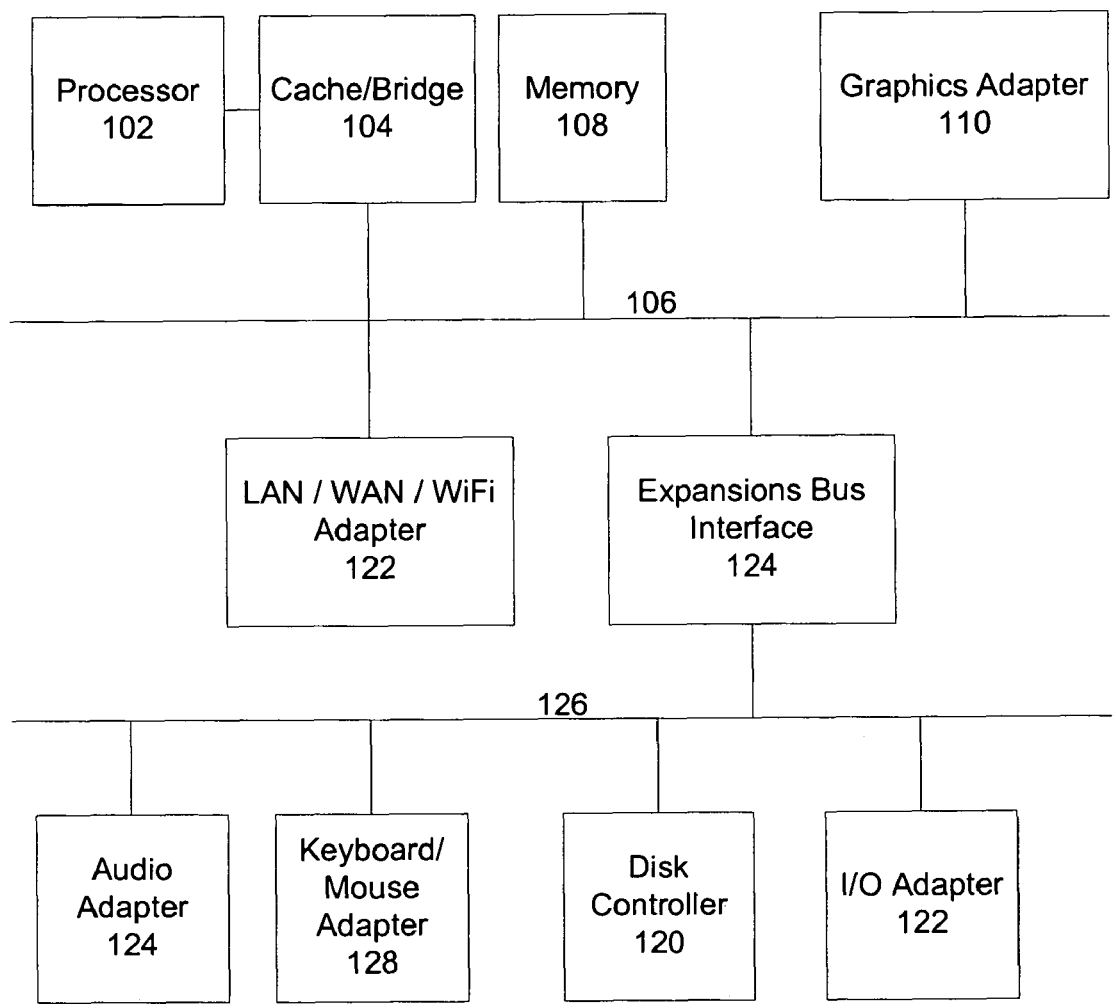
FIG. 1 depicts a block diagram of a data processing system in which a preferred embodiment can be implemented.

FIG. 1 depicts a block diagram of a data processing system in which a preferred embodiment can be implemented, as any of the disclosed data processing systems. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 418 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

A preferred embodiment of the present invention includes a screensaver to be installed on all workstations, where each workstation is a data processing system capable of communicating with a server data processing system. It should be noted, however, that the system and method described herein are not actually concerned with preserving the life of a computer display, and the claimed invention can be implemented without any "screensaver" display on the client system at all, or indeed even if there is no display attached to the client system. Screensavers are a common function of data processing systems that have gone into an "idle" mode, and so a screensaver is included in at least some embodiments.

The screensaver on the workstation starts up after a given period of inactivity (typically 10 minutes), and enables a coverage analysis test client on the workstation. As a result, if a user is away from their machine for any length of time, when the screensaver starts, their machine becomes available to run tests for the coverage analysis server.

A coverage analysis tool, as used in this context, is a system for executing and testing software code, and analyzing the results and completeness of the testing.

The coverage analysis server preferably stores a list of all the machines that have a client screensaver installed, and so are potential candidates for running tests. It should be understood that a single coverage test typically includes many different individual code tests, and so individual code tests (and multiples of them) can be performed on different client systems, and the results from each system can be combined to reflect the results of the coverage test as a whole.

Figure 2:
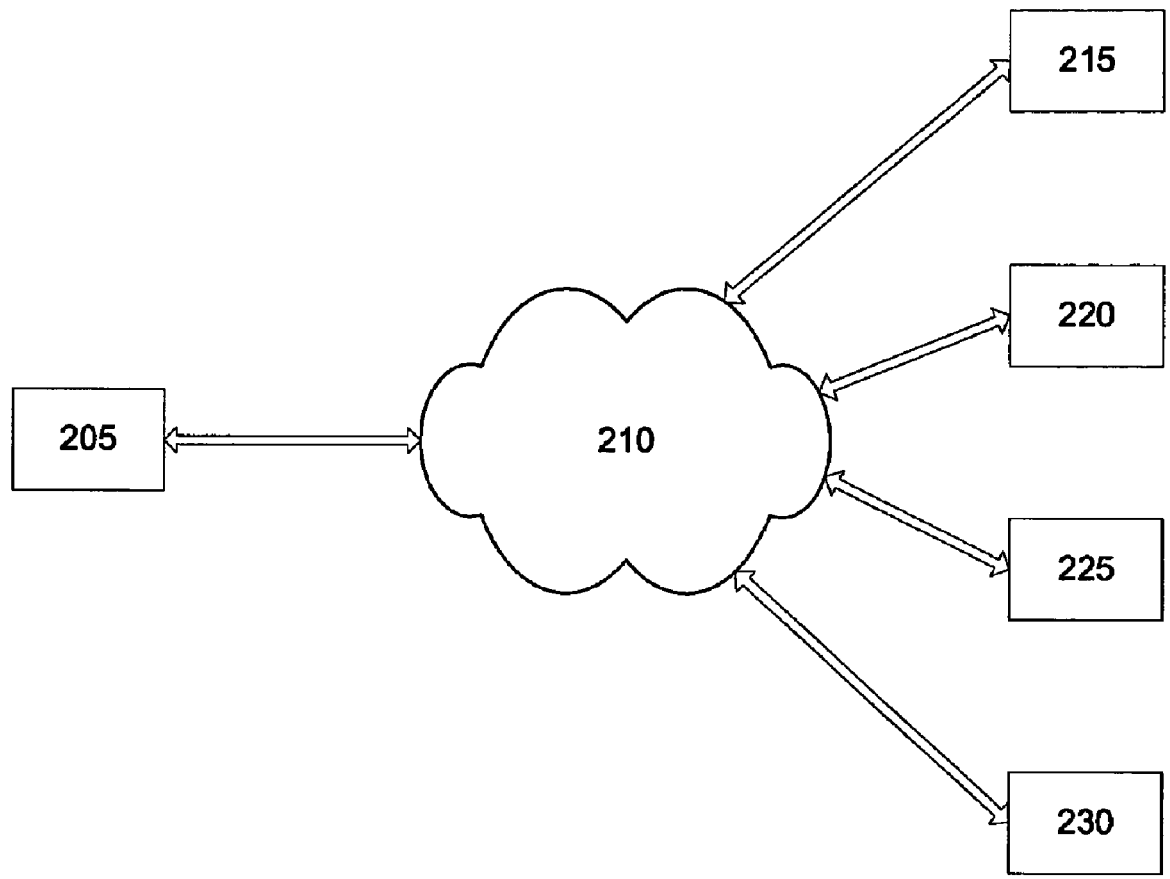
FIG. 2 depicts a block diagram of a data processing system network in accordance with a preferred embodiment of the present invention.

FIG. 2 depicts a block diagram of a data processing system network in accordance with a preferred embodiment of the present invention. This includes the coverage analysis server 205, that connects over network 210 with clients 215/220/225/230, each of which has the coverage analysis screensaver installed. Network 215 can be any known type of public or private data processing system network, including LAN, WLAN, WiFi, WAN, or the Internet. Note that while one server and four clients are shown in this exemplary diagram, other implementations can include any number of servers or client systems.

When a test is to be run, the server 205 probes each client 215/220/225/230 in turn by attempting to send it test code. If a client does not respond, the server assumes it is currently disabled, and does not send it any more test code for the duration of the test set run. Alternately, the client can be configured to respond with a specific status code indicating whether it is available for testing.

If the client does respond, the server transmits two files to the client machine—the version of the dynamically linked library (DLL) required for the test process, called here "library.dll", and the version of the executable to be tested, called here "example.exe". These are versions of the file that have been compiled by the developer who wishes to run a coverage test set.

The client system, by the screensaver program, will then test the example.exe executable, using the library.dll. The actual testing process performed by the screensaver is conventional and known to those of skill in the art.

When the test is completed, the screensaver on the client system will compile the results and transmit them back to the server system.

Figure 3:
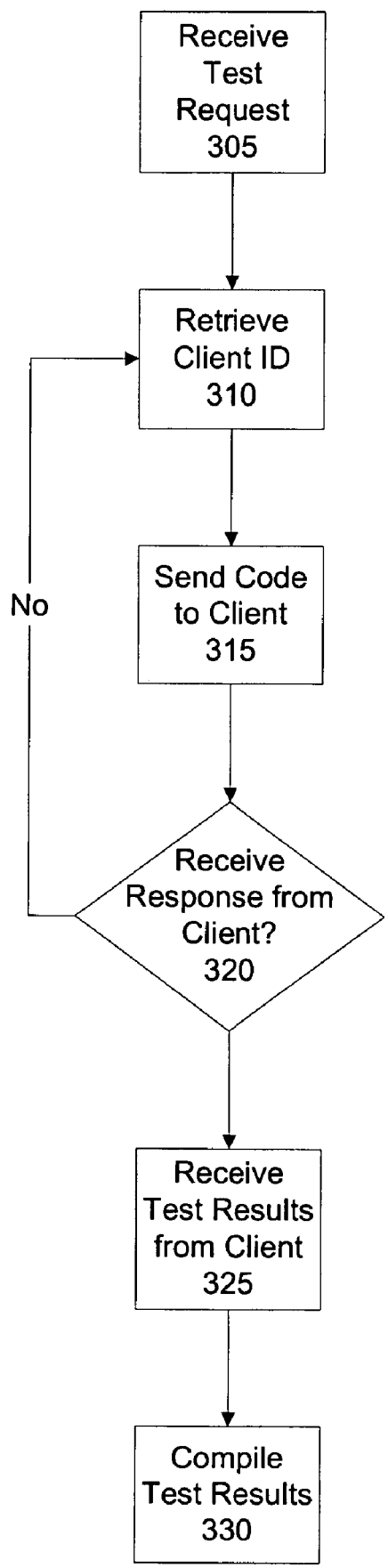
FIG. 3 depicts a flowchart of a process in accordance with a preferred embodiment.

FIG. 3 depicts a flowchart of a process in accordance with a preferred embodiment. Here, the server receives a request to test code (step 305), generally from a user command. This request preferably includes the name of the modified modules or files that are to be compiled, linked, and tested.

The server will then access a list of client system identifiers and retrieve at least one client ID (step 310). The server will send code to be tested, as described above, to the client system (step 315).

Note that while the process description of FIG. 3 involves only one client, in a typical operation, this process is performed with many different clients at substantially the same time. By doing so, multiple clients can each test a different code portion, as described herein.

If the server does not receive a response from the client (step 320), it notes that that client is currently unavailable, and retrieves the next client it (returning to step 310). Generally, this is because the client system is busy with another task, and so can't be dedicated to coverage testing.

If a response is received (at step 320), the server knows that the client is performing the coverage test. When the results are received (step 325), they are compiled with any other test result from other clients (step 330), and a report is created and stored.

Figure 4:
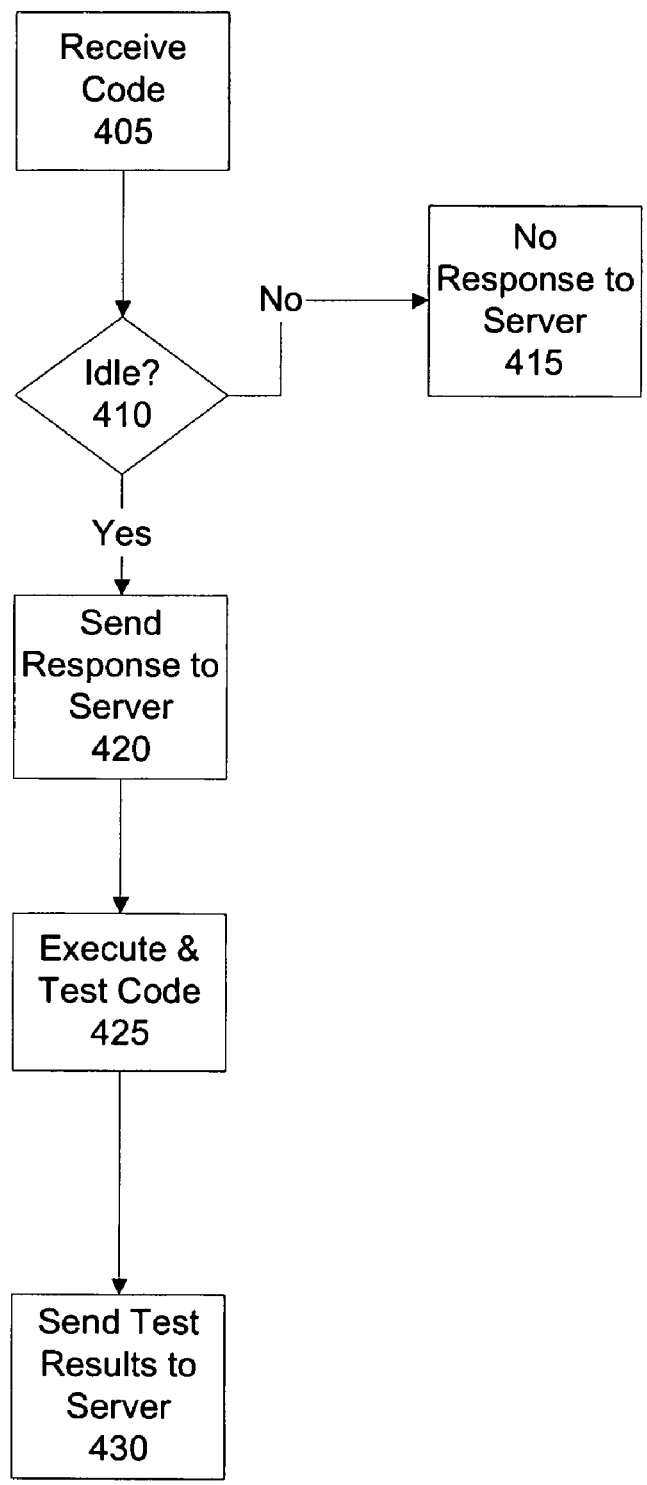
FIG. 4 depicts a flowchart of a process in accordance with a preferred embodiment.

FIG. 4 depicts flowchart of a process performed by a client system in accordance with a preferred embodiment. Here, the client system will receive code to be tested from a server system (step 405). If the client is not idle (step 410), i.e., if the client is performing another task, then it will not respond to the server (step 415), and will simply continue whatever task it is performing.

If the client is idle (step 410), however, it will respond to the server (step 420) to acknowledge that it will perform the code testing.

The client executes and tests the code as described herein (step 425). When complete, the client will send the test results to the server system (step 430).

Although other systems are known for taking advantage of otherwise-idle processor time for processing "chunks" of data, the disclosed client actually receives test code to be run from the coverage analysis server, and returns the result of running the code.

Further, unlike typical screensaver client technologies that cause the client to contact and register itself with the server when the client is started, at least in some disclosed embodiments, the coverage analysis screensaver merely enables or disables a test client, and the client does not independently contact the server. This reduces network traffic.

Unlike known systems, in the disclosed embodiments, the client receives code over the client-server link rather than mere data to be analyzed. According to some embodiments, the code sent from the server to the client includes the dynamically linked library, the executable, and additional lisp code specifying the test to be run.

While in preferred embodiment, the server only determines which clients are available at the beginning of the test run, other embodiments enable the server to check periodically for extra clients being added to the list.

Also, a preferred embodiment provides that the priority of the client that is started up by the screen saver is 'idle' (very low priority), which means that if the machine owner wants to run other background processes when not using their machine, the test client loses priority. Alternately, the user can specify that the test client priority should be higher, for example by manually setting it to 'normal' or even higher.

In an exemplary implementation, the increased efficiency of the disclosed embodiments was quickly seen. Previously, a typical "standalone" coverage analysis system could run through approximately 2000 tests in an hour. Using the disclosed distributed processing test process, test sets are on average running 200% faster, i.e. approximately 6000 tests per hour. On some occasions, the claimed system and method provided a peak turn-around of about 10000 tests per hour. This results in a significant time saving for developers, who want a quick turn-around in their test runs to enable them to return to coding or bug fixing.

Those of skill in the art will recognize modifications, variations, and improvements that can be made to the disclosed embodiments. For example, one alternate embodiment includes a queuing system that allows developers to submit which functions they want to see retested to a queue, and the system handles each submission in turn. Another embodiment also includes a ranking system that allows jobs submitted later to take precedence.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for testing code in a client data processing system, comprising:
   receiving executable code front a server system in a client data processing system;
   if the client data processing system is in an idle state when the executable code is received, then
   sending a response to the server system,
   testing at least a portion of the executable code, and
   sending test results to the server system; wherein if the client data processing system is not in all idle state when the executable code is received, then no response is sent to the server and no testing is performed.

2. The method of claim 1, wherein the testing is a coverage analysis test.

3. The method of claim 1, wherein the client data processing system is in an idle state when no user is actively operating the client data processing system.

4. A data processing system comprising a processor and accessible memory, the data processing system configured to:
   receive executable code from a server system in a client data processing system; and,
   if the client data processing system is in an idle state when the executable code is received,
   send a response to the server system,
   test at least a portion of the executable code, and
   send test results to the server system; wherein if the client data processing system is not in an idle state when the executable code is received, then no response is sent to the server and no testing is performed.

5. The data processing system of claim 4, wherein the testing is a coverage analysis test.

6. The data processing system of claim 4, wherein the client data processing system is in an idle state when no user is actively operating the client data processing system.

7. A computer program product tangibly embodied in a non-transitory machine-readable medium, comprising:
   instructions for receiving executable code from a server system in a client data processing system;
   instructions for, if the client data processing system is in an idle state when the executable code is received,
   sending a response to the server system,
   testing at least a portion of the executable code, and
   sending test results to the server system; wherein if the client data processing system is not in an idle state when the executable code is received, then no response is sent to the server and no testing is performed.

8. The computer program product of claim 7, wherein the testing is a coverage analysis test.

9. The computer program product of claim 7, wherein the client data processing system is in an idle state when no user is actively operating the client data processing system.

* * * * *